(12) United States Patent
Lewis et al.

(10) Patent No.: US 10,489,501 B2
(45) Date of Patent: Nov. 26, 2019

(54) SYSTEMS AND METHODS FOR DISPLAYING ANNOTATED VIDEO CONTENT BY MOBILE COMPUTING DEVICES

(71) Applicant: Google Inc., Mountain View, CA (US)

(72) Inventors: Justin Lewis, Marina Del Ray, CA (US); Kevin Greene, San Francisco, CA (US)

(73) Assignee: Google LLC, Mountain View, CA (US)

( * ) Notice: Subject to any disclaimer, the term of this patent is extended or adjusted under 35 U.S.C. 154(b) by 781 days.

(21) Appl. No.: 13/861,234

(22) Filed: Apr. 11, 2013

(65) Prior Publication Data
US 2014/0310586 A1    Oct. 16, 2014

(51) Int. Cl.
*G06F 17/24* (2006.01)
*G06F 3/048* (2013.01)

(52) U.S. Cl.
CPC .................. *G06F 17/241* (2013.01)

(58) Field of Classification Search
CPC ............. G06F 17/241; G06F 17/3082; G06F 16/7867; G06F 3/048; G06F 3/0481; G06F 3/0482; G06F 16/70; G06F 16/78; G06F 3/0484; G06F 3/04842
USPC .......................... 715/230, 233; 345/156, 173
See application file for complete search history.

(56) References Cited

U.S. PATENT DOCUMENTS

| | | | | |
|---|---|---|---|---|
| 5,600,775 A * | 2/1997 | King | .................. | H04N 7/15 715/203 |
| 6,092,068 A * | 7/2000 | Dinkelacker | ......... | G06F 17/272 |
| 8,065,313 B2 * | 11/2011 | Yagnik | ............... | G06K 9/00664 707/758 |
| 8,112,702 B2 * | 2/2012 | Badoiu | ................ | G11B 27/105 715/230 |
| 8,364,020 B2 * | 1/2013 | Lui | ........................ | G06F 17/241 386/278 |
| 8,392,821 B2 * | 3/2013 | DeMarco | ........... | H04N 21/4825 715/230 |

(Continued)

FOREIGN PATENT DOCUMENTS

| | | |
|---|---|---|
| CN | 102446210 | 5/2012 |
| CN | 102473259 A | 5/2012 |

(Continued)

OTHER PUBLICATIONS

International Searching Authority, US, Notification of Transmittal of the International Search Report and the Written Opinion of the International Search Authority, or the Declaration for International application No. PCT/US2014/033653, dated Sep. 11, 2014, 7 pages.

(Continued)

*Primary Examiner* — Jose R Soto Lopez
(74) *Attorney, Agent, or Firm* — Lowenstein Sandler LLP

(57) ABSTRACT

Systems and methods for displaying annotated video content by mobile computing devices. An example method may comprise: presenting, on a display of a mobile computing device, a video stream including a plurality of video frames; presenting a video annotation overlaid over a frame of the plurality of video frames; receiving a user interface command via a user input interface of the mobile computing device; and performing an action related to the video annotation, the action defined by the user interface command.

20 Claims, 9 Drawing Sheets

(56) References Cited

U.S. PATENT DOCUMENTS

| | | | |
|---|---|---|---|
| 8,475,284 B1* | 7/2013 | Rudi | A63F 13/5258 463/42 |
| 2002/0065678 A1* | 5/2002 | Peliotis | H04N 7/163 725/35 |
| 2003/0231198 A1* | 12/2003 | Janevski | G11B 27/105 715/704 |
| 2004/0194021 A1 | 9/2004 | Marshall et al. | |
| 2005/0183005 A1 | 8/2005 | Denoue et al. | |
| 2006/0184872 A1* | 8/2006 | Dontcheva | G06F 17/241 715/251 |
| 2008/0077844 A1 | 3/2008 | Kim et al. | |
| 2008/0140623 A1* | 6/2008 | Tien | G06F 16/3325 |
| 2008/0154908 A1* | 6/2008 | Datar | G11B 27/11 |
| 2008/0229192 A1* | 9/2008 | Gear | G06F 16/58 715/268 |
| 2009/0044144 A1* | 2/2009 | Morris | G06F 3/04842 715/804 |
| 2009/0187825 A1* | 7/2009 | Sandquist | G06F 16/70 715/719 |
| 2009/0300473 A1* | 12/2009 | Adams | G06F 16/958 715/205 |
| 2009/0300475 A1* | 12/2009 | Fink | H04N 7/17318 715/230 |
| 2009/0327856 A1* | 12/2009 | Mouilleseaux | G11B 27/034 715/230 |
| 2010/0037149 A1* | 2/2010 | Heath | G06F 3/0481 715/753 |
| 2010/0083153 A1* | 4/2010 | Jain | G06F 17/241 715/765 |
| 2011/0063236 A1 | 3/2011 | Arai et al. | |
| 2011/0163992 A1* | 7/2011 | Cordeiro | G06F 3/0416 345/174 |
| 2011/0164163 A1* | 7/2011 | Bilbrey | G06F 1/1694 348/333.01 |
| 2012/0017176 A1* | 1/2012 | Choi | G06F 3/0482 715/825 |
| 2012/0069052 A1 | 3/2012 | Lee et al. | |
| 2012/0072957 A1* | 3/2012 | Cherukuwada | H04N 21/23412 725/93 |
| 2012/0151347 A1* | 6/2012 | McClements, IV | G06Q 10/101 715/716 |
| 2012/0221972 A1* | 8/2012 | Patterson | G06F 17/2235 715/810 |
| 2012/0254369 A1 | 10/2012 | Gillard et al. | |
| 2013/0042171 A1* | 2/2013 | Yang | G06F 16/4393 715/230 |
| 2013/0044050 A1* | 2/2013 | Ylivainio | G06F 3/0481 345/156 |
| 2013/0080916 A1* | 3/2013 | Lopez | H04N 5/445 715/753 |
| 2013/0204608 A1* | 8/2013 | Baker | G06F 17/241 704/9 |
| 2013/0249906 A1* | 9/2013 | Gunderson | G06T 15/20 345/420 |
| 2013/0314441 A1* | 11/2013 | Grasset | G06T 1/00 345/633 |
| 2013/0318465 A1* | 11/2013 | Cheng | G06F 3/0483 715/776 |
| 2013/0332834 A1* | 12/2013 | Li | G06F 16/78 715/719 |
| 2014/0053111 A1* | 2/2014 | Beckman | G06F 3/04812 715/856 |
| 2014/0063174 A1* | 3/2014 | Junuzovic | G06Q 10/101 348/14.02 |
| 2014/0111516 A1* | 4/2014 | Hall | G06T 11/60 345/428 |
| 2014/0149884 A1* | 5/2014 | Flynn, III | G06Q 10/10 715/752 |
| 2014/0258831 A1* | 9/2014 | Henderson | G06F 17/241 715/233 |
| 2014/0337705 A1* | 11/2014 | Glover | G06F 17/241 715/230 |
| 2015/0100875 A1* | 4/2015 | Kim | G06F 17/242 715/232 |
| 2015/0149883 A1* | 5/2015 | Masuko | G06T 11/00 715/232 |

FOREIGN PATENT DOCUMENTS

| | | |
|---|---|---|
| CN | 102740127 A | 10/2012 |
| JP | 10187737 A | 7/1998 |
| JP | 11088861 A | 3/1999 |
| JP | 2006113632 A | 4/2006 |
| JP | 2008084320 A | 4/2008 |
| JP | 2009519552 A | 5/2009 |
| JP | 2010098730 A | 4/2010 |
| JP | 2011060209 A | 3/2011 |
| JP | 2011215824 A | 10/2011 |
| WO | 2007070733 A | 6/2007 |

OTHER PUBLICATIONS

European Patent Office, Extended European Search Report for EP Application No. 14783503.7, dated Nov. 22, 2016, 8 pages.

Nuno Correia et al: "Active video watching using annotation" Proceedings of the Seventh ACM International Conference on Multimedia (Part 2) ACM Orlando Florida United States; Oct. 1, 1999 (Oct. 1, 1999); pp. 151-154.

CN Office Action for Application No. 201480020687.3, dated Dec. 20, 2017, 13 pages.

JP Office Action for Application No. 2016-507660 dated Mar. 5, 2018, 10 pages.

Chinese Office Action for Application No. 201480020687.3 issued by the China National Intellectual Property Administration dated Jun. 28, 2019, 37 pages.

* cited by examiner

SYSTEMS AND METHODS FOR DISPLAYING ANNOTATED VIDEO CONTENT BY MOBILE COMPUTING DEVICES

TECHNICAL FIELD

The present disclosure is generally related to computer systems, and is more specifically related to systems and methods for displaying annotated video content by computing devices.

BACKGROUND

Content sharing platforms allow viewing sharing content, such as video content, image content, and/or audio content. In certain examples, the shared content may be represented by streaming media. Streaming media is multimedia, such as video and/or audio content, which may be received by and presented to an end-user while being delivered by a streaming provider over a network (e.g., the Internet). Furthermore, some content sharing platforms provide live streaming of media, as well as streaming of pre-recorded media content.

SUMMARY

A method for displaying annotated video content by computing devices is presented. A mobile computing device may present a video stream including a plurality of video frames and a video annotation overlaid over a frame of the plurality of video frames. The mobile computing device may receive a user interface command via a user input interface of the mobile computing device. The mobile computing device may perform an action related to the video annotation, as defined by the user interface command.

Furthermore, computing devices for performing the operations of the above referenced method and computer readable storage media storing instructions causing the computing devices to perform the operations of the above referenced methods are also presented.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
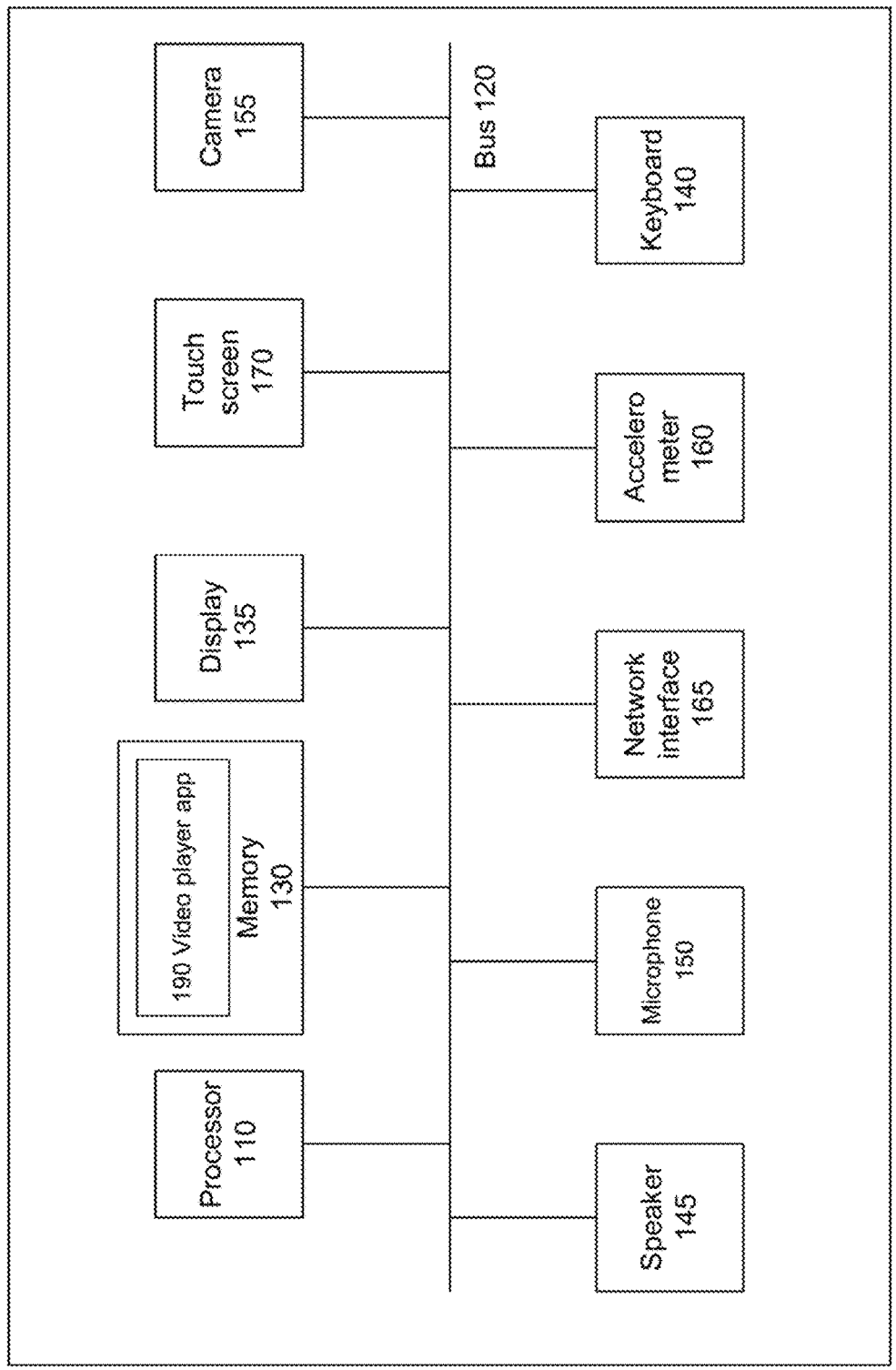
FIG. 1 depicts a block diagram of one illustrative example of a mobile computing device operating in accordance with one or more aspects of the present disclosure.

Described herein are methods and systems for displaying annotated video content by mobile computing devices. "Mobile computing device" herein shall refer to a portable device having a processor, a memory, and at least one communication interface. Examples of mobile computing devices include, without limitation, smart phones, tablet computers, and notebook computers.

A mobile computing device may execute a video player application for displaying a video stream which may be downloaded over a network from a streaming server. The video streaming functionality may be employed in entertainment, educational, and other applications. In certain implementations, a mobile computing device described herein may be capable of displaying a video stream containing video annotations. "Video annotation" herein shall refer to one or more visual elements overlaid over a plurality of frames of a video stream and intended for conveying information to a user and/or for prompting the user to issue one or more user interface commands. Video annotations may be used, for example, to provide additional information related to the video content being displayed, accept a user's input selecting a content to be displayed (for example, selecting one of several possible viewing paths or selecting a fragment of the currently displayed video stream), provide a link to a related content item, and/or provide a link to a related application executable by the mobile computing device.

Mobile computing devices (for example, mobile phones, tablet computers, or smart phones), as compared, e.g., to desktop computers, may have a screen of a smaller size and/or resolution, thus making some traditional user interface commands difficult to implement. On the other hand, mobile computing devices may enhance the end user experience by providing a wide variety of user interface devices which may be employed to input user's commands, including, e.g., a touch screen, a video or still image camera, a microphone, and/or accelerometer. Hence, in certain implementations, a mobile computing device employed to play back a video stream containing video annotations, may modify the video annotations in view of the user interface features of the mobile computing device. In one example, the mobile computing device may modify a video annotation by resizing it to fit the screen of the mobile computing device. In another example, the mobile computing device may modify a video annotation by changing its display position in view of the screen size of the mobile computing device. In a further example, the mobile computing device may rearrange two or more video annotations on the screen of the mobile computing device to prevent visual intersections of the video annotation elements.

In another aspect, the mobile computing device may define one or more user interface commands (including, for example, touch screen gestures and/or accelerometer measured gestures) applicable to the video annotations being displayed by the mobile computing device. The mobile computing device may assign a user interface command to each of one or more possible system actions. User interface commands may include those inputted via a touch screen, a camera, a microphone, and/or an accelerometer. System actions corresponding to the user interface commands may include playback control commands (such as pause, stop, rewind, and/or fast forward), content selection commands (such as display a related content item), and/or application control commands (such as launch a defined application), etc.

In a further aspect, the mobile computing device, while playing back a video stream containing video annotations, may accept user commands via various user interfaces including, for example, a touch screen, a video or still image camera, a microphone and/or an accelerometer. Each user interface command may cause the mobile computing device to perform a function defined by the command and/or the context of the application being executed. In one example, the mobile computing device may recognize a number of user's gestures issued through a touch screen, including, for example, tapping, double-tapping, pressing, swiping, pinching, and/or rotating the touch screen. In another example, user's gestures may be inputted via a video or still image camera. In a further example, user's voice commands or other sound commands (e.g., whistling) may be inputted via a microphone. In a further example, an accelerometer may be used to accept user's commands involving moving the mobile computing device according to one or more pre-defined patterns including defined frequency, amplitude, and/or direction of movement (e.g., shaking the mobile computing device in the horizontal or vertical plane, rotating the mobile computing device, etc.).

Responsive to receiving a user interface command, the mobile computing device may determine an action corresponding to the user interface command, based on one or more records stored within a data structure associated with the video annotation and mapping user interface commands to video player application actions. The mobile computing device may then perform an action related to the video annotation, as defined by the user interface command.

Various aspects of the above referenced methods and systems are described in details herein below by way of examples, rather than by way of limitation.

FIG. 1 depicts a block diagram of one illustrative example of a mobile computing device operating in accordance with one or more aspects of the present disclosure. The mobile computing device may be provided, for example, by a smart phone, a tablet computer, a personal digital assistant, or a notebook computer.

The mobile computing device 100 may comprise a processor 110 coupled to the system bus 120. The latter may comprise a data bus, an address bus, and/or a control bus. The processor 110 may be provided by one or more physical processors such as a general purpose processor (for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (for example, an application specific integrated circuit (ASIC), a field programmable gate array (FPGA), a digital signal processor (DSP), or a network processor).

Other devices coupled to the system bus may include a memory 130, a display 135, a keyboard 140, a speaker 145, a microphone 150, a video or still image camera 155, an accelerometer 160, and/or one or more wireless network interfaces 165. The term "coupled" herein shall include both electrically connected and communicatively coupled via one or more interface devices, adapters and the like.

The memory 130 may include one or more volatile memory devices (for example, RAM chips), one or more non-volatile memory devices (for example, ROM or EEPROM chips), and/or one or more secondary memory devices (for example, a storage memory device, such as an optical or magnetic disk). The storage memory may include a non-transitory computer-readable storage medium on which may be stored instructions implementing the methods described herein.

In certain implementations, the memory 130 may store instructions of a video player application 190. In one illustrative example, the video player application 190 may execute on the mobile device 100 to present video content containing video annotations, receive a user interface command pertaining to one of the annotations from touch screen 170, camera 155, microphone 150 or accelerometer 150, and perform an action related to the annotation in response to the user interface command, in accordance with one or more aspects of the present disclosure.

The wireless network interface 165 may be provided, for example, by an IEEE 802.11-compliant interface, a cellular interface (such as a 3G or 4G interface, including UMTS, LTE, WiMAX, HSPA, or EV-DO), and/or a Bluetooth interface. The mobile computing device 100 may implement a network protocol stack, such as TCP/IP, to support communications over the wireless network interface 165.

In certain implementations, the mobile computing device 100 may include a touch screen input device 170, represented, e.g., by a touch-sensitive and/or presence-sensitive surface of the display 135. In one example, the touch-sensitive surface may comprise a capacity-sensitive layer. In another example, the touch-sensitive surface may comprise two or more acoustic transducers placed along the horizontal and vertical axes of the display.

In certain implementations, the mobile computing device 100 equipped with a touch screen, responsive to detecting a contact of the touch-sensitive surface by an external object, may determine the position of the contact, the change of the position relatively to the previous position, and/or manner of contact (e.g., whether the external object is moving while keeping the contact with the touch-sensitive surface). The external object employed for contacting the touch screen may be represented, for example, by the user's finger, a stylus, or by any other suitable device.

Based on the detected touch/release events, the determined position of the contact, the change of the contact position, and/or the manner of the contact, the computing device 100 may recognize one or more user input gesture types, including, for example, tapping, double tapping, pressing, swiping, pinching, and/or rotating the touch screen, as schematically illustrated by FIGS. 2a-2f.

Figure 2A:
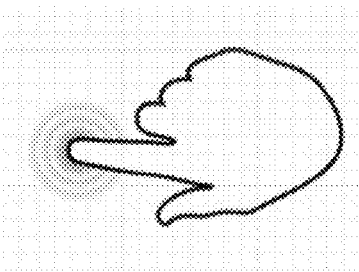
FIGS. 2a-2f schematically illustrates several user input gesture types recognizable by the mobile computing device operating in accordance with one or more aspects of the present disclosure.
Figure 2B:
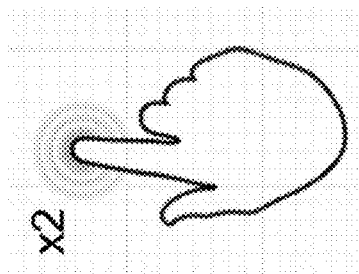
Figure 2C:
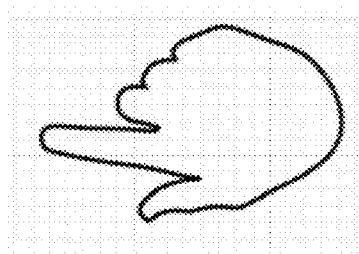
Figure 2D:
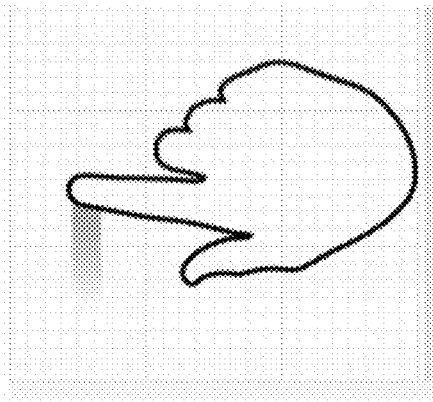
Figure 2E:
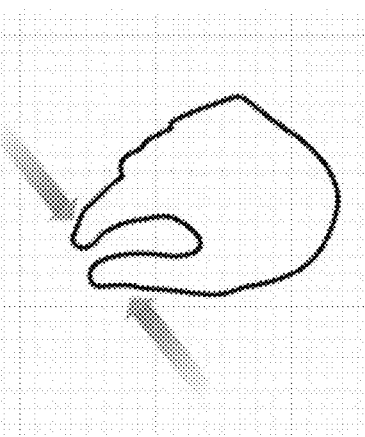
Figure 2F:
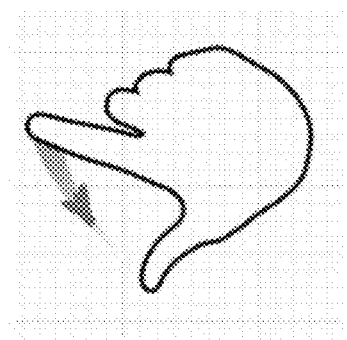

Tapping is a contact continuing for less than a first pre-defined duration threshold and followed by a release of more than a second pre-defined duration threshold, as schematically illustrated by FIG. 2a. Tapping involves no movement of the external object over the touch-sensitive surface. Double tapping comprises two consecutive tapping gestures with an intervening release less than the second pre-defined duration threshold, as schematically illustrated by FIG. 2b. Pressing, or long pressing, is a contact continuing for more than the first pre-defined duration threshold, as schematically illustrated by FIG. 2c. Swiping is a contact involving a movement of the external object over the touch sensitive surface along an imaginary straight line segment, as schematically illustrated by FIG. 2d. Pinching is a contact by two external objects (e.g., the user's two fingers) moving towards each other along a segment of an imaginary straight or curved line, as schematically illustrated by FIG. 2e. Rotating is a contact by two external objects (e.g., the user's two fingers) moving in the same direction along an imaginary circle, as schematically illustrated by FIG. 2f.

In certain implementations, the mobile computing device 100 may be equipped with an accelerometer measuring the proper acceleration of the mobile computing device. In one example, the mobile computing device may be programmed to accept, using the accelerometer, user interface commands comprising the user's moving the mobile computing device using one or more pre-defined patterns including defined frequency, amplitude, and/or direction of movement (e.g., shaking the mobile computing device in the horizontal or vertical plane, rotating the mobile computing device, etc.).

In certain implementations, the mobile computing device 100 may be equipped with a video or still image camera. In one example, the camera may be employed for inputting user interface commands represented by user's gestures.

In certain implementations, the mobile computing device 100 may be equipped with a microphone. In one example, the microphone may be employed for inputting user's voice commands or other sound commands (e.g., whistling).

Figure 3:
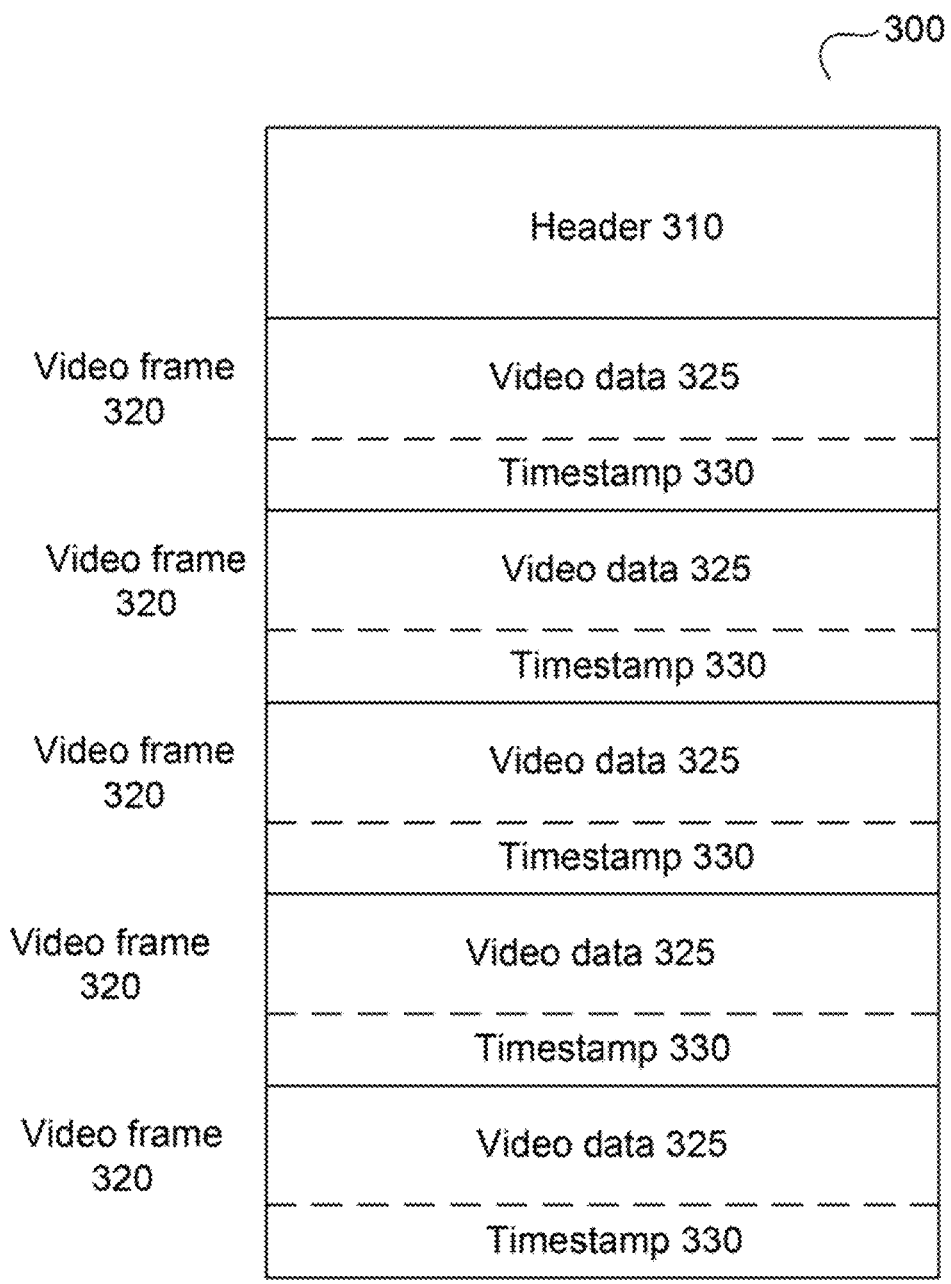
FIG. 3 schematically illustrates en example structure of a video stream displayable by the mobile computing device operating in accordance with one or more aspects of the present disclosure.

In certain implementations, the mobile computing device 100 may execute a video player application which may play back a video stream and/or an audio stream. The mobile computing device 100 may play back audio streams compressed using audio codecs (e.g., MP3, Vorbis or AAC) and/or video streams compressed using video codecs (e.g., H.264 or VP8). In one example, the mobile computing device may play back a combined bit stream (e.g., FLV, WebM, ASF or ISMA) containing encoded audio and video streams. As schematically illustrated by FIG. 3, a video stream 300 may comprise a header 310 and a plurality of video frames 320. Each video frame 320 may include video data 325 and a timestamp 330.

Figure 4:
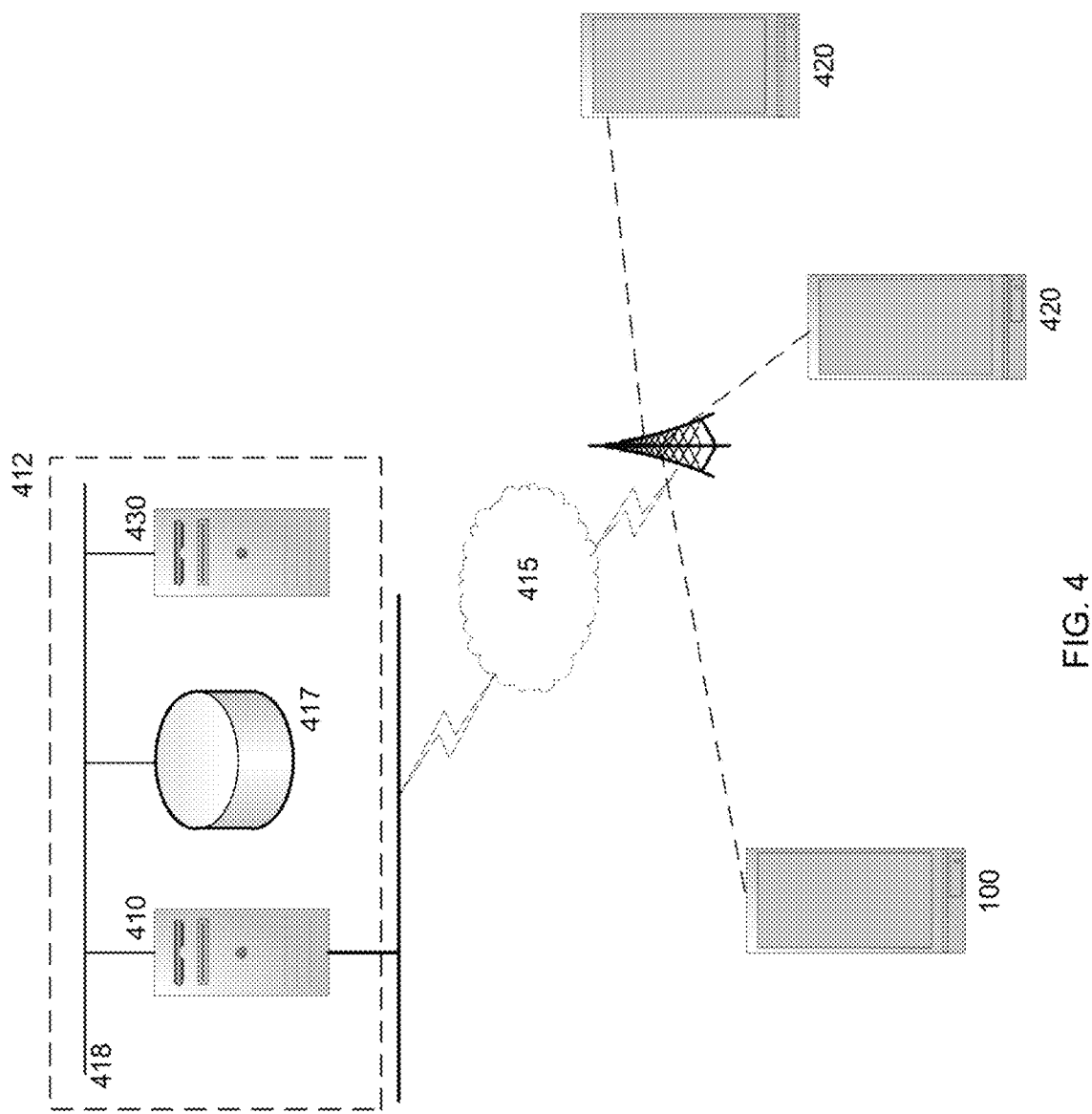
FIG. 4 schematically illustrates a network-level diagram of a network including a video streaming server, a video annotation server, and a plurality of video streaming clients, in accordance with one or more aspects of the present disclosure.

In certain implementations, the mobile computing device 100 may display a video stream while the latter is being received, e.g., from a streaming server 410 or a peer mobile computing device 420, over the network 415, as schematically illustrated by FIG. 4. The streaming server 410 may, in one example, be part of a shared content hosting and delivery platform 412, which may also be referred to as a content sharing platform. The network 415 may, in one example, include the Internet. Other networks, including wired and wireless networks, such as intranets, local area networks (LANs), wide area networks (WANs), and/or virtual private networks (VPNs) may be part of network 415.

As illustrated by FIG. 4, the shared content hosting and delivery platform 412 may include a front-end streaming server 410 coupled to a content data store 417 via a network 418. The content data store 417 may be provided by a local or distributed database, a file repository, or any other data repository of a suitable architecture. The content data store 417 may be employed to store a plurality of content items (collectively referred to as "content") which may include, e.g., video clips, TV clips (news, sports, shows, etc.), music videos, video blog entries, and/or video shorts. In one illustrative example, the content may include one or more items uploaded by users of the shared content hosting and delivery platform 412 for sharing with other users. Uploaded content items may include data captured and/or transmitted by the mobile computing device 100 over the network 415.

The network 418 may be provided by a local area network. Other networks, including the Internet, one or more intranets, local area networks (LANs), wide area networks (WANs), and/or virtual private networks (VPNs) may be part of network 418. In certain implementations, the shared content hosting and delivery platform 412 may further comprise a video annotation server 430 employed to deliver video annotations as described in more details herein below.

Although the front-end server 410, the content data store 417, and the video annotation server 430 are depicted in FIG. 4 as separate components, these and other components of the content hosting and delivery platform 412 may be implemented together in a single computing device or in various combinations of multiple different computing devices and systems that may be interconnected over one or more networks, including LANs and/or WANs. In certain implementations, the shared content hosting and delivery platform 412 may further comprise other components, such as a load balancer (not shown in FIG. 4) which may be employed to dispatch user requests received over the network 415 to a plurality of front-end servers 410. In certain implementations, the shared content hosting and delivery platform 412 may further comprise a user directory which may be employed to authenticate users accessing the shared content hosting and delivery platform 412.

In one illustrative example, a user may access the content stored by hosting and delivery platform 412 via a mobile computing device 100 over network 415. The mobile computing device 100 may control the streaming process by issuing control messages (e.g., Real-time Streaming Protocol (RTSP) messages) to the streaming server 410. The video stream may be delivered from the streaming server 410 to the mobile computing device 100 using a transport protocol, such as Real-time Transport Protocol (RTP). The mobile computing device 100 may periodically send quality of service (QoS) information to the streaming server 410 using Real-time Transport Control Protocol (RTCP). As an alternative to RTP/RTCP streaming, the mobile computing device 100 may, in certain implementations, employ HTTP progressive download to perform adaptive bitrate streaming.

In certain implementations, the mobile computing device 100 may be a member of a multicast group receiving a multicast stream transmitted by the streaming server 410 to a plurality of recipients 420. A member of a multicast group usually has a limited or no ability to control transmission by the server. In order to improve the end user's viewing experience, the mobile computing device 100 may buffer the received video stream thus allowing end user issue playback control commands, such as pause, stop, rewind, and/or fast forward.

In certain implementations, the mobile computing device 100 may receive a video stream from one or more peer mobile computing devices 420 using a peer-to-peer (P2P) protocol. One or more fragments of the video stream may be received from each of one or more peer mobile computing devices. The video stream may be assembled by the mobile computing device 100 before the playback.

In certain implementations, the video stream played back by the mobile computing device 100 may contain one or more video annotations. Video annotations may be used, for example, to provide additional information related to the video content being displayed, accept a user input selecting a content to be displayed (for example, to provide multiple viewing paths and/or a table-of-contents functionality), provide a link to a related content item, and/or provide a link to a related application executable by the mobile computing device. The mobile computing device 100 may accept (e.g., via the keyboard, the touch screen, and/or the accelerometer) a user input related to a video annotation and causing the mobile computing device to perform a certain function to control the play back process. Examples of actions selectable by the user input include: pausing the video stream displaying, jumping to a chosen position within the video stream, displaying a related content (e.g., another video stream, or a static image), and/or switching to another application executable by the mobile computing device.

Figure 5:
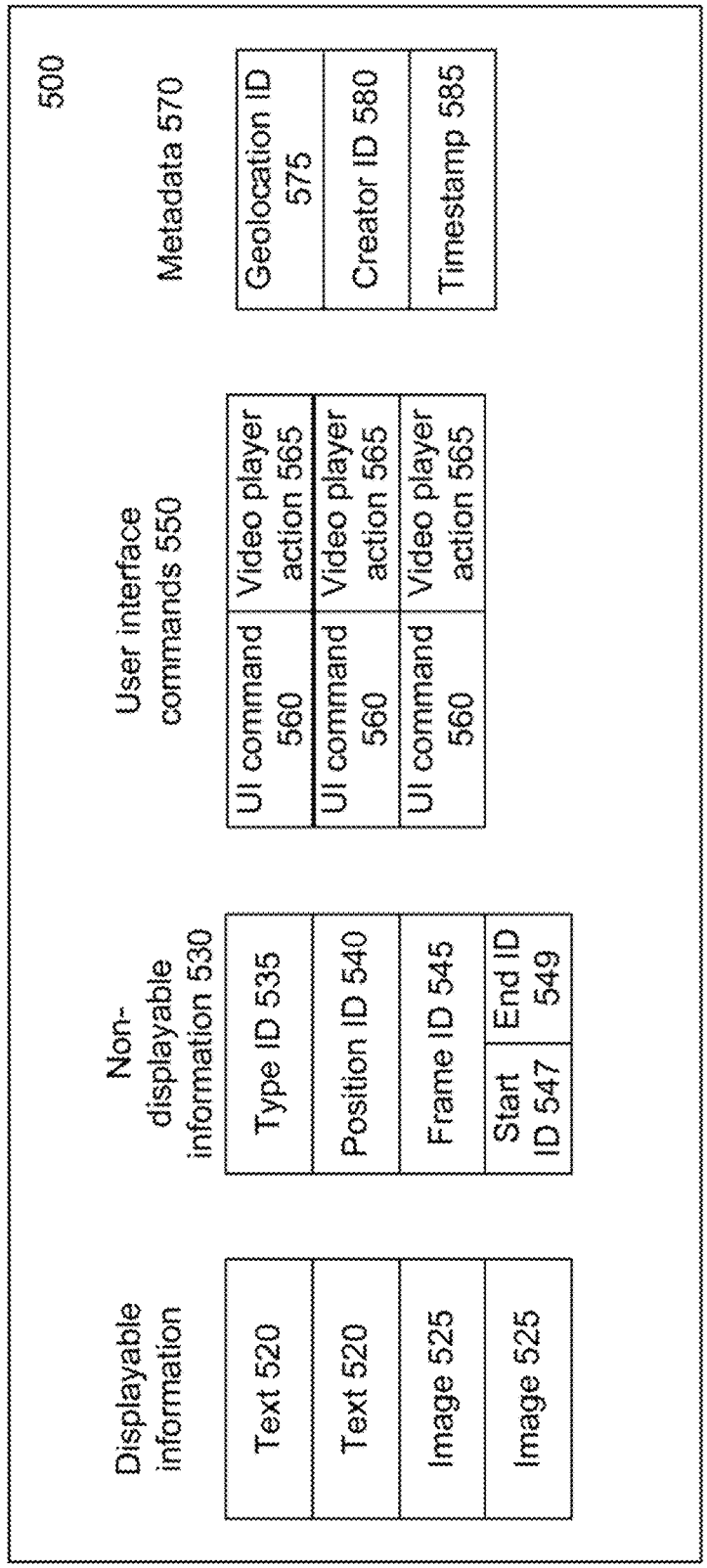
FIG. 5 schematically illustrates en example structure of a video annotation displayable by the mobile computing device operating in accordance with one or more aspects of the present disclosure.

As schematically illustrated by FIG. 5, a video annotation 510 may comprise one or more text strings 520 and/or one or more images 5250 to be displayed within a video frame. In certain implementations, a video annotation may further comprise a data structure 530 storing non-displayable information, including, for example, a video annotation type identifier 535 (e.g., a title, a speech bubble, a note, a label, a spotlight, or a video thumbnail), a display position identifier 540 defining the position within the video frame where the video annotation should be displayed, and/or a video frame identifier 545 defining a plurality of video frames within which the video annotation is to be displayed. In certain implementations, the video frame identifier may be represented by a start frame identifier 547 and end frame identifier 549 which may define the start frame and the end frame of the frame range within the video annotation should be displayed. In one example, the start frame identifier and the end frame identifier may identify the start time and end time, relative to the start of the video stream.

In certain implementations, a video annotation may further comprise a data structure 550 storing one or more records associating a user interface command 560 and a corresponding video player action 565 (e.g., a click within a video annotation field may be mapped to a URI identifying a related resource, a double click within a video annotation field may be mapped to jumping to a defined part of the video stream, etc.). In certain implementations, a video annotation may further comprise a data structure 570 storing non-displayable metadata, including, for example, a geolocation identifier 575 identifying the location where the video stream has been captured, an identifier 580 of a video annotation creator/editor, and/or the video annotation creation/editing date and time 585.

In certain implementations, a video annotation identifier may be stored within the video stream, and the data structures associated with the video annotation may be retrieved by the video player application from a video annotation server 430, which may be different from the video streaming server 420, as schematically illustrated by FIG. 4. Alternatively, the data structures associated with the video annotation may be stored within the video stream.

Figure 6:
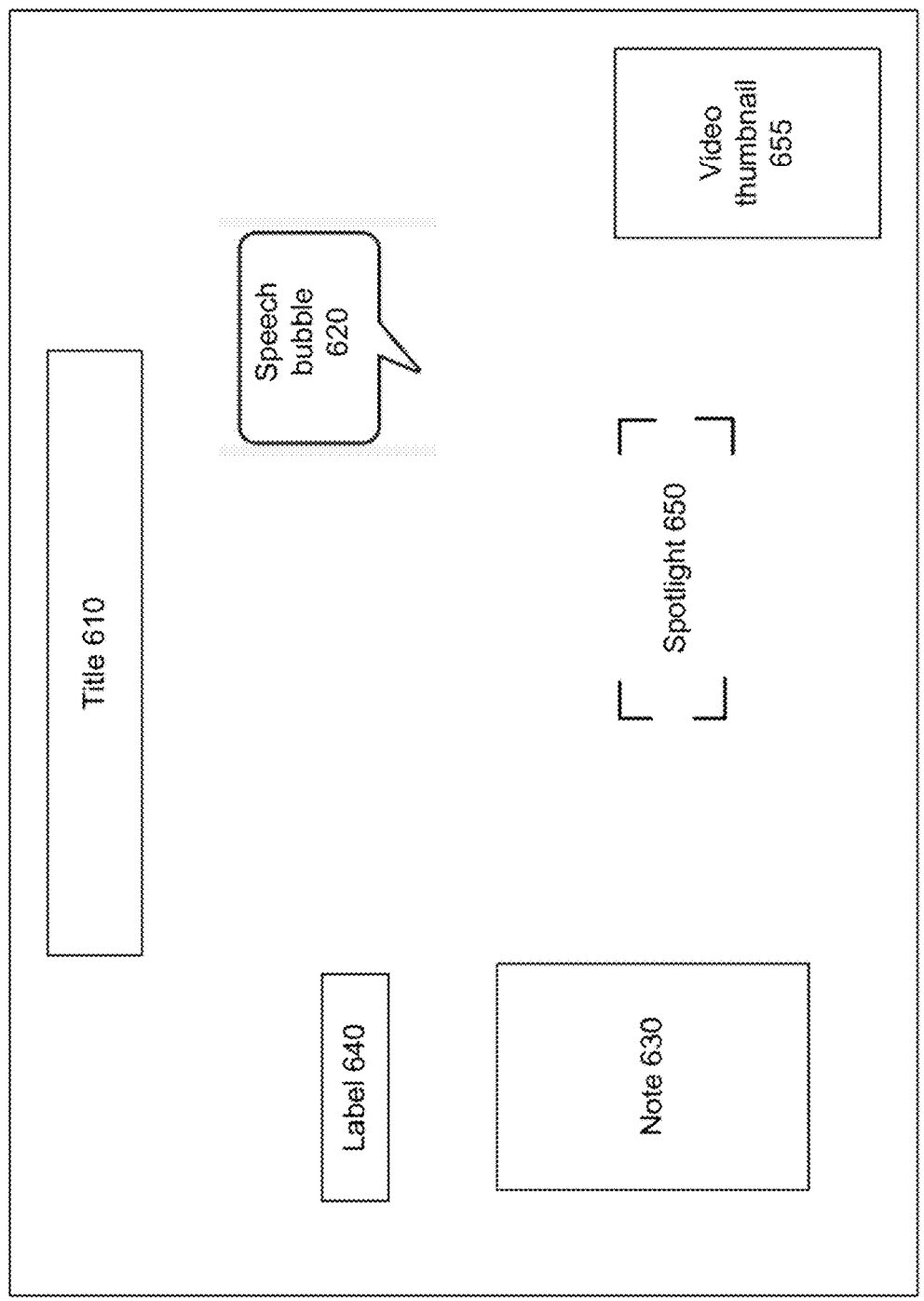
FIG. 6 schematically illustrates screen representations of several types of video annotations, in accordance with one or more aspects of the present disclosure.

FIG. 6 schematically illustrates various types of video annotations. In one example, a video annotation may be represented by a title 610. In another example, a video annotation may be represented by a speech bubble 620. In a further example, a video annotation may be represented by a note 630. In a further example, a video annotation may be represented by a label 640. In a further example, a video annotation may be represented by a spotlight 650. In a further example, a video annotation may be represented by a video thumbnail 655.

Video annotations accompanying a video stream may be designed for displaying by a computing device having a screen of a larger size and/or having a higher resolution than a typical mobile computing device screen. As a result of this, a video annotation displayed by a mobile computing device may have a size inadequate for being distinguishable and readable by the user. In some situations, two or more video annotations may be displayed spatially very close to each other so that a user's attempt to select one of the video annotations (e.g., by clicking on a corresponding link) would often result in erroneously selecting a wrong video annotation (e.g., by clicking a wrong link). Furthermore, video annotations designed for a generic computing device may only accept clicking or double-clicking on a video annotation field, and would not be designed to accept various touch screen user interface inputs.

Hence, the mobile computing device 100 may process the video stream to modify and/or adjust the video annotations accompanying the video stream for displaying by the mobile computing device 100. In one example, the mobile computing device 100 may resize one or more video annotations to make them viewable and/or selectable by the user's touch screen input on the screen of the mobile computing device 100. Resizing a video annotation may include resizing the font of a video annotation message, e.g., based on a pre-defined minimum font size for a given screen size of the mobile computing device 100, to improve the annotation message readability. Resizing a video annotation may further include resizing one or more visual elements of the video annotation, e.g., based on a pre-defined minimum visual element size for a given screen size of the mobile computing device 100.

In another example, the mobile computing device 100 may re-position one or more video annotations to make them viewable and/or selectable by the user's touch screen input on the screen of the mobile computing device 100. Re-positioning a video annotation may be based on one or more repositioning rules, such as, moving a video annotation in a direction defined relatively to a pre-defined corner of the screen. In one example, re-positioning several video annotations displayed within a single frame may be based on a sequence of re-positioning directions defined relatively to one or more pre-defined corners of the screen (e.g., moving a first video annotation towards an upper left corner of the screen, followed by moving a second video annotation towards an upper right corner of the screen). In a further example, the mobile computing device may rearrange two or more video annotations on the screen of the mobile computing device to prevent visual intersections of the video annotation elements.

In certain implementations, the mobile computing device 100 may define one or more user interface commands (including, for example, touch screen gestures and/or accelerometer measured gestures) applicable to the video annotations being displayed by the mobile computing device 100. The mobile computing device may assign a user interface command to each of one or more possible system actions. User interface commands may include those inputted via a touch screen, a camera, a microphone, and/or an accelerometer. System actions corresponding to the user interface commands may include playback control commands (such as pause, stop, rewind, and/or fast forward), content selection commands (such as display a related content item), and/or application control commands (such as launch a defined application), etc.

Responsive to displaying a video annotation overlaid over one or more frames of a video stream, the mobile computing device may receive a user interface command via a touch screen, a camera, a microphone, and/or an accelerometer. The user interface command may be represented, for example, by one or more gestures issued through a touch screen, including tapping, double-tapping, pressing, swiping, pinching, and/or rotating the touch screen. In another example, the user interface command may be represented by a voice and/or sound command inputted via a microphone. In a further example, the user interface command may be represented by one or more user's gestures inputted via a video or still image camera. In a further example, the user interface command may involve the user's moving the mobile computing device according to one or more pre-defined patterns including defined frequency, amplitude, and/or direction of movement (e.g., shaking the mobile computing device in the horizontal or vertical plane, rotating the mobile computing device, etc.).

Responsive to receiving a user interface command, the mobile computing device may determine an action corresponding to the user interface command, based on one or more records stored within a data structure associated with the video annotation and mapping user interface commands to video player application actions. The mobile computing device may then perform an action related to the video annotation, as defined by the user interface command. Examples of actions selectable by the user interface commands include: pausing the video stream displaying, jumping to a chosen position within the video stream, displaying a related content (e.g., another video stream, or a static image), and/or switching to another application executable by the mobile computing device.

Figure 7:
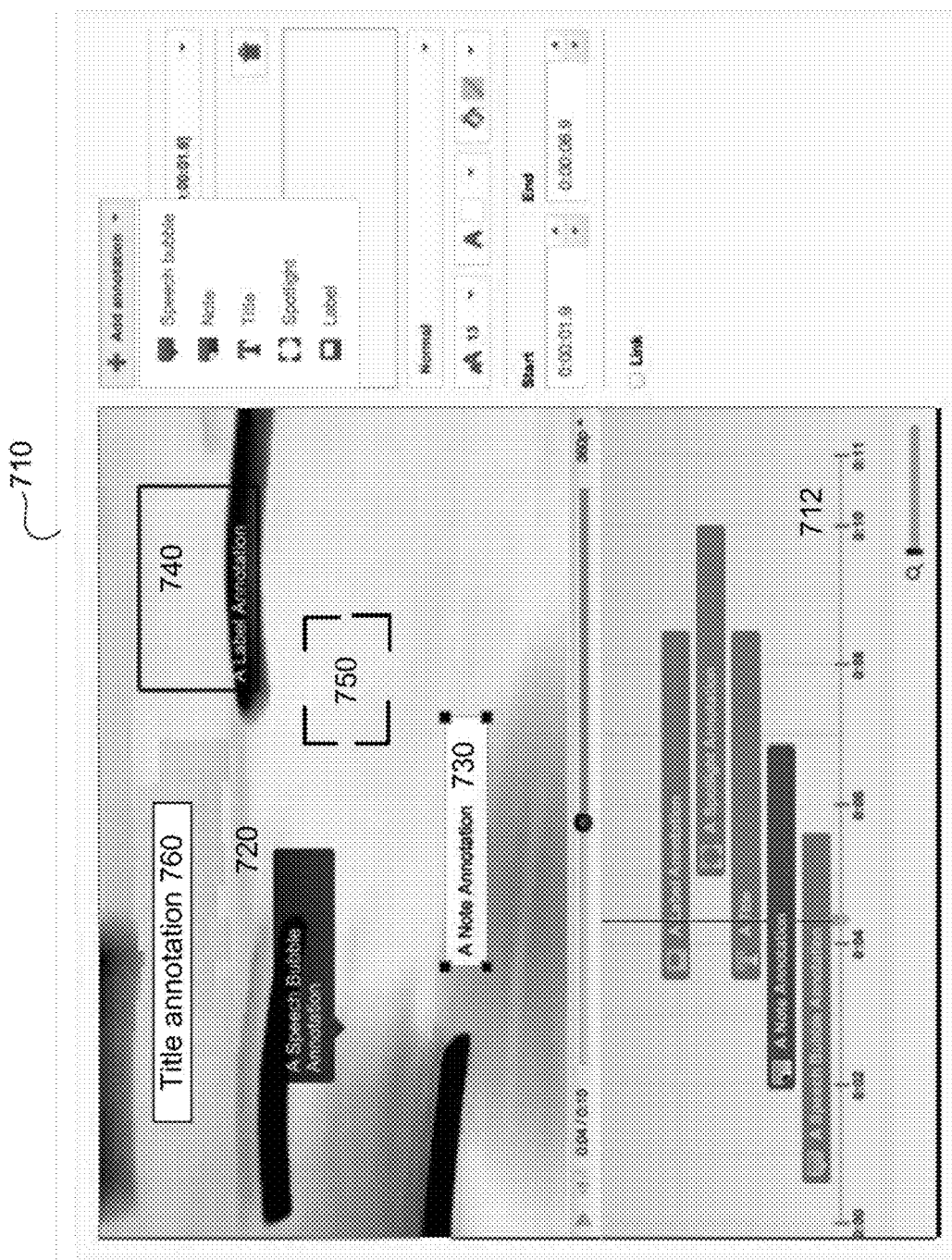
FIG. 7 depicts a video frame editing window for creating video annotations, in accordance with one or more aspects of the present disclosure.

Video annotations for a video content item may be created using a video annotation editor executable by a desktop or a mobile computing device. In certain implementations, mobile computing device 100 may display the video stream being edited in a frame window 710, as schematically illustrated by FIG. 7. The mobile computing device 100 may accept one or more user interface commands with respect to inserting video annotations into one or more video frames. The video frames may be selected by the user based on the displayed time line 712, and/or by playing, fast forwarding and/or rewinding the video stream being edited. In certain implementations, a video annotation search function may be implemented accepting user's input to specify one or more search terms related to a video annotation, and displaying one or more frames containing video annotations conforming to the search terms (e.g., a speech bubble including a user provided string).

In certain implementations, responsive to receiving a user interface command, the mobile computing device may insert a speech bubble annotation 720, a note annotation 730, a label annotation 740, a spotlight annotation 750, and/or a title annotation 760. The voice command may comprise the annotation type, the annotation position relatively to a pre-defined frame corner or other annotation elements, the annotation text, and/or other annotation parameters (such as, for example, font size). In one example, the user interface command may be received via a microphone. Alternatively, the user interface command may be received via a touch screen. In certain implementations, some elements of the user interface command may be received via a first user interface, while other elements of the user interface command may be received via a second user interface (e.g., a speech bubble text may be inputted via a microphone, and the speech bubble position may be inputted via the touch screen). In certain implementations, some user interface commands may be applicable to a plurality of video annotations displayed in a single frame (e.g., responsive to detecting the user's shaking the mobile computing device, the latter may re-position the video annotations displayed within a currently displayed frame to eliminate visual intersections of the video annotation elements).

Figure 8:
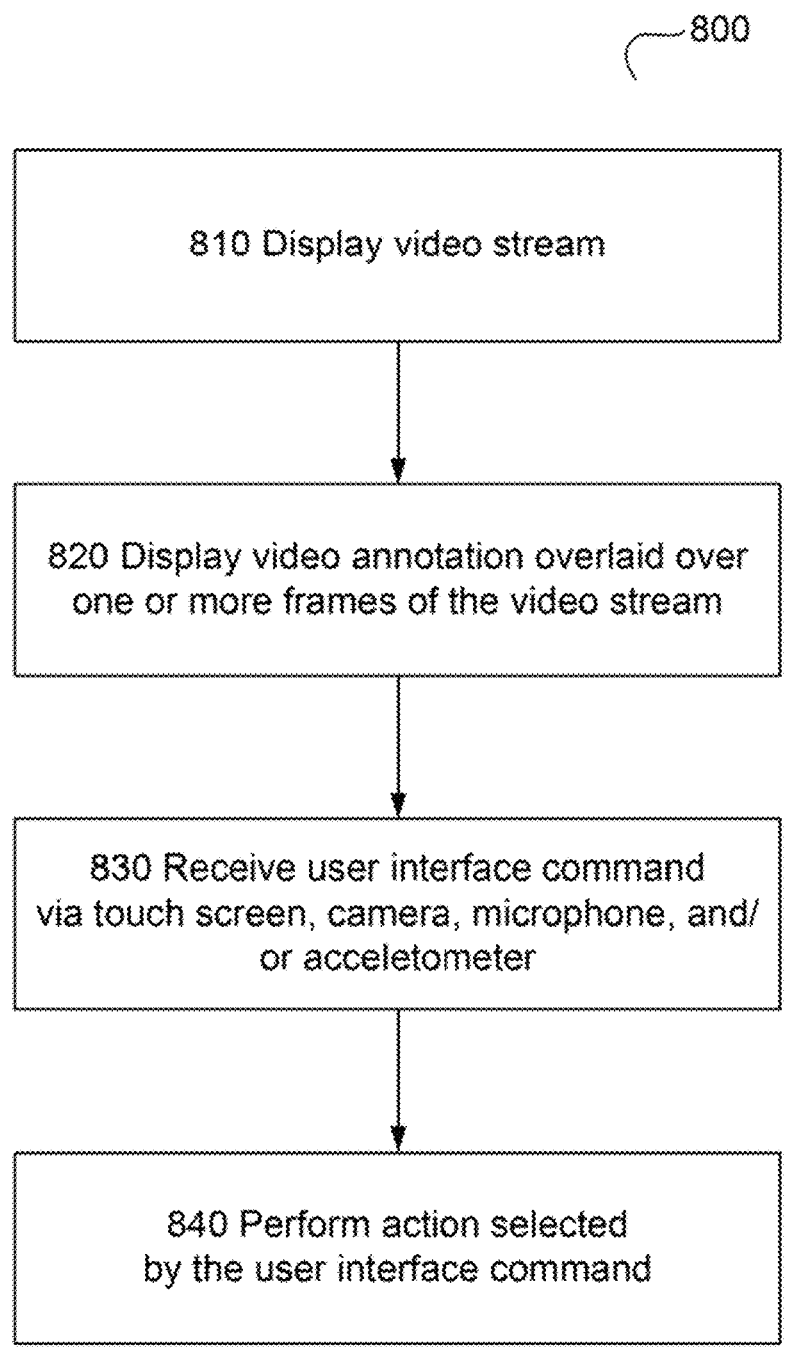
FIG. 8 depicts a flow diagram of one illustrative example of a method for displaying annotated video content by a mobile computing device in accordance with one or more aspects of the present disclosure.

FIG. 8 depicts a flow diagram of one illustrative example of a method 800 for displaying annotated video content by a mobile computing device in accordance with one or more aspects of the present disclosure. The method 800 may be performed by processing logic (e.g., of video player application 190 executing on mobile computing device 100) that may comprise hardware (e.g., circuitry, dedicated logic, and/or programmable logic), software (e.g., instructions executable on a computer system to perform hardware simulation), or a combination thereof. The method 800 and/or each of its individual functions, routines, subroutines, or operations may be performed by one or more physical processors of the computing device executing the method. Two or more functions, routines, subroutines, or operations of the method 800 may be performed in parallel or in an order which may differ from the order described above.

At block 810, the mobile computing device may play back a video stream including a plurality of video frames. As noted herein above, in certain implementations, the mobile computing device may display the video stream while the latter is being received, e.g., from a streaming server or a peer mobile computing device, over a wireless communication interface.

At block 820, the mobile computing device may display a video annotation overlaid over one or more frames of the video stream. As noted herein above, in certain implementations, the mobile computing device may modify the video annotation prior to displaying, e.g., by re-sizing the video annotation to better fit the screen of the mobile computing device, and/or by re-positioning the video annotation on the screen, as described in more details herein above.

At block 830, the mobile computing device may receive a user interface command via a user input interface of the mobile computing device. In certain implementations, the user input interface may be provided by a touch screen, a camera, a microphone, and/or accelerometer, as described in more details herein above. The mobile computing device may then determine an action corresponding to the user interface command, based on one or more records stored within a data structure associated with the video annotation and mapping user interface commands to video player application actions, as described in more details herein above.

At block 840, the mobile computing device may perform an action related to the video annotation, as defined by the user interface command. Responsive to completing the operations referenced by block 840, the method may terminate.

Figure 9:
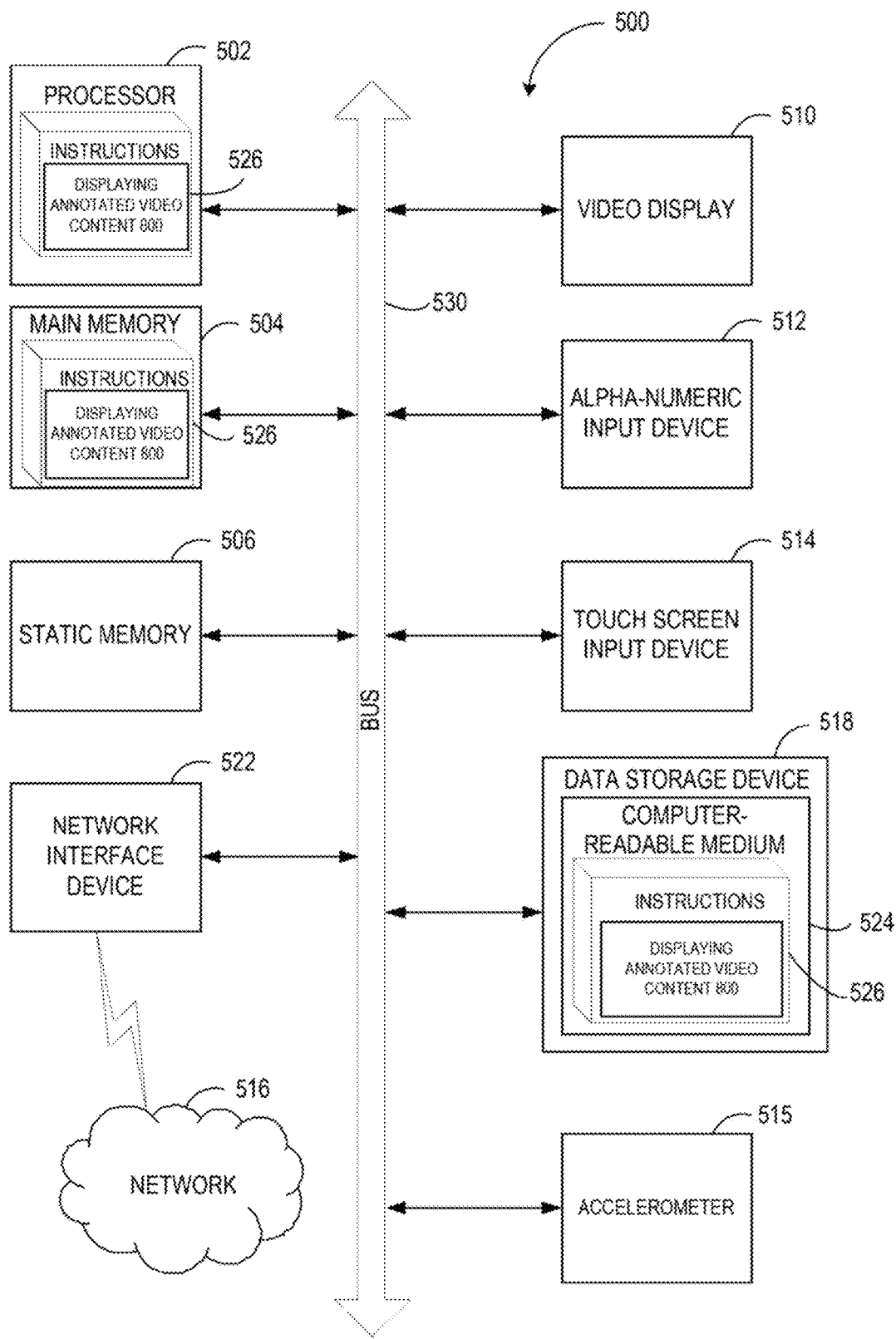
FIG. 9 depicts a block diagram of an illustrative computer system operating in accordance with examples of the present disclosure.

FIG. 9 illustrates a block diagram of an exemplary computer system 500 within which a set of instructions, for causing the computer system to perform any one or more of the methods discussed herein, may be executed. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a personal computer (PC), a tablet PC, a set-top box (STB), a Personal Digital Assistant (PDA), a cellular telephone, a web appliance, a server, a network router, switch or bridge, or any computer system capable of executing a set of instructions (sequential or otherwise) that specify actions to be taken by that computer system. Further, while only a single computer system is illustrated, the term "computer system" shall also be taken to include any collection of computer system s that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a touch screen input device 514, and an accelerometer 515.

The data storage device 518 may include a computer-readable storage medium 524 on which is stored one or more sets of instructions 526 embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 516 via the network interface device 522.

In certain implementations, the instructions 526 may include instructions for a method of displaying annotated video content, which may correspond to the method 800 of FIG. 8 and be performed using video player application 190 of FIG. 1. While the computer-readable storage medium 524 is shown in the example of FIG. 9 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The invention claimed is:

1. A method comprising:
 receiving a first position identifier for a first annotation to be overlaid over one or more frames of a video during presentation of the video, wherein the first position identifier defines a first position of the first annotation within the frames where the first annotation is overlaid, and wherein the first position is designed for presentation on a first display of a first computing device;
 presenting the video on a second display of a mobile computing device, wherein the second display is smaller than the first display, and wherein presentation of the first annotation on the second display at the first position prevents the first annotation from being readable by a user of the mobile computing device within the second display;

modifying, by a processing device of the mobile computing device, the first annotation, wherein modifying the first annotation comprises repositioning the first annotation from the first position in the frames of the video for the first display to a second position in the frames of the video for the second display in view of a screen size of the second display to make the first annotation readable by the user within the second display, and wherein the second positon in the frames of the video is different than the first positon in the frames of the video; and presenting the first annotation overlaid over the frames at the second position during presentation of the video on the second display.

2. The method of claim 1, wherein the first annotation has a first size, wherein the first size is designed for presentation on the first display, wherein presentation of the first annotation on the second display at the first size prevents the first annotation from being readable by the user within the second display, wherein modifying the first annotation comprises resizing the first annotation from the first size in the frames of the video for the first display to a second size in the frames of the video for the second display in view of the screen size to make the first annotation readable by the user within the second display, wherein the second size in the frames of the video is different than the first size in the frames of the video, and wherein presenting the first annotation comprises presenting the first annotation overlaid over the frames at the second size during presentation of the video on the second display.

3. The method of claim 2, wherein resizing the first annotation comprises resizing a font size of a message in the first annotation.

4. The method of claim 3, wherein resizing the font size is based on a minimum font size for the screen size.

5. The method of claim 2, wherein resizing the first annotation comprises resizing one or more visual elements of the first annotation, and wherein resizing the visual elements is based on a minimum visual element size for the screen size.

6. The method of claim 2, wherein presentation of the first annotation on the second display at the first size prevents the first annotation from being selectable by the user within a touch screen of the second display, wherein resizing the first annotation is further to make the first annotation selectable by the user within the touch screen.

7. The method of claim 1, further comprising:

receiving a third position identifier for a second annotation to be overlaid over at least one frame in the frames of the video during presentation of the video, wherein the third position identifier defines a third position of the second annotation within the frame where the first annotation is overlaid, wherein the third position is designed for presentation on the first display, and wherein presentation of the first annotation at the first position in the frame on the second display causes a visual intersection with presentation of the second annotation at the third position in the frame on the second display;

modifying the second annotation, wherein modifying the second annotation comprises repositioning the second annotation from the third position in the frames of the video for the first display to a fourth position in the frames of the video for the second display in view of the screen size to prevent the visual intersection between the first annotation and the second annotation, and wherein the fourth positon in the frames of the video is different than the third positon in the frames of the video; and presenting the second annotation overlaid over the frame at the fourth position during presentation of the video on the second display.

8. The method of claim 7, further comprising receiving a user interface command, wherein repositioning the first annotation and the second annotation is in response to receipt of the user interface command.

9. The method of claim 1, wherein the annotation is represented by at least one of: a title, a speech bubble, a note, a label, a spotlight, or a video thumbnail.

10. The method of claim 7, wherein presentation of the first annotation at the first position in the frame on the second display is spatially close to presentation of the second annotation at the third position in the frame on the second display, and wherein repositioning the first annotation and the second annotation is further to prevent erroneous selection due to the first annotation being spatially close to the second annotation.

11. The method of claim 1, wherein presentation of the first annotation on the second display at the first position prevents the first annotation from being selectable by the user within a touch screen of the second display, and wherein repositioning the first annotation is further to make the first annotation selectable by the user within the touch screen.

12. A mobile computing device comprising:

a second display; and a processor, in communication with the second display, configured to:

receive a first position identifier for a first annotation to be overlaid over one or more frames of a video during presentation of the video, wherein the first position identifier defines a first position of the first annotation within the frames where the first annotation is overlaid, and wherein the first position is designed for presentation on a first display of a first computing device;

present the video on the second display of the mobile computing device, wherein the second display is smaller than the first display, and wherein presentation of the first annotation on the second display at the first position prevents the first annotation from being selectable by a user of the mobile computing device within a touch screen of the second display;

modify the first annotation, wherein, to modify the first annotation, the processor is configured to reposition the first annotation from the first position in the frames of the video for the first display to a second position in the frames of the video for the second display in view of a screen size of the second display to make the first annotation selectable by the user within the touch screen, and wherein the second positon in the frames of the video is different than the first positon in the frames of the video; and present the first annotation overlaid over the frames at the second position during presentation of the video on the second display.

13. The mobile computing device of claim 12, wherein the first annotation has a first size, wherein the first size is designed for presentation on the first display, wherein presentation of the first annotation on the second display at the first size prevents the first annotation from being readable by the user within the second display or selectable by the user within the touch screen, wherein, to modify the first annotation, the processor is further configured to resize the first annotation from the first size in the frames of the video for the first display to a second size in the frames of the video for the second display in view of the screen size to make the first annotation readable by the user within the second display and selectable by the user within the touch screen, wherein the second size in the frames of the video is different than the first size in the frames of the video, and wherein the processor is further configured to present the first annotation overlaid over the frames at the second size during presentation of the video on the second display.

14. The mobile computing device of claim 13, wherein, to resize the first annotation, the processor is further configured to resize a font size of a message in the first annotation.

15. The mobile computing device of claim 14, wherein the processor is further configured to resize the font size based on a minimum font size for the screen size.

16. The mobile computing device of claim 13, wherein, to resize the first annotation, the processor is further configured to resize one or more visual elements of the first annotation, and wherein the processor is further configured to resize the visual elements based on a minimum visual element size for the screen size.

17. The mobile computing device of claim 12, wherein the processor is further configured to:
receive a third position identifier for a second annotation to be overlaid over at least one frame in the frames of the video during presentation of the video, wherein the third position identifier defines a third position of the second annotation within the frame where the first annotation is overlaid, wherein the third position is designed for presentation on the first display, and wherein presentation of the first annotation at the first position in the frame on the second display causes a visual intersection with or is spatially close to presentation of the second annotation at the third position in the frame on the second display;
modify the second annotation, wherein, to modify the second annotation, the processor is configured to reposition the second annotation from the third position in the frames of the video for the first display to a fourth position in the frames of the video for the second display in view of the screen size to prevent the visual intersection between the first annotation and the second annotation and erroneous selection due to the first annotation being spatially close to the second annotation, and wherein the fourth positon in the frames of the video is different than the third positon in the frames of the video; and
present the second annotation overlaid over the frame at the fourth position during presentation of the video on the second display.

18. The mobile computing device of claim 17, wherein the processor is further configured to receive a user interface command, and wherein the processor is configured to reposition the first annotation and the second annotation in response to receipt of the user interface command.

19. The mobile computing device of claim 12, wherein presentation of the first annotation on the second display at the first position prevents the first annotation from being readable by the user within the second display, and wherein, to reposition the first annotation, the processor is further configured to make the first annotation readable by the user within the second display.

20. A computer-readable non-transitory storage medium comprising executable instructions that, when executed by a processing device, cause the processing device to:
receive a first annotation to be overlaid over one or more frames of a video during presentation of the video, wherein the first annotation has a first size, and wherein the first size is designed for presentation on a first display of a first computing device;
present the video on a second display of a mobile computing device, wherein the second display is smaller than the first display, and wherein presentation of the first annotation on the second display at the first size prevents the first annotation from being readable by a user of the mobile computing device within the second display or selectable by the user within a touch screen of the second display;
modify, by the processing device of the mobile computing device, the first annotation, wherein, to modify the first annotation, the processing device is to resize the first annotation from the first size in the frames of the video for the first display to a second size in the frames of the video for the second display in view of a screen size of the second display to make the first annotation readable by the user within the second display and selectable by the user within the touch screen, and wherein the second size in the frames of the video is different than the first size in the frames of the video; and
present the first annotation overlaid over the frames at the second size during presentation of the video on the second display.

* * * * *